H. LEHMANN.
SELF LOADING RECOIL GUN.
APPLICATION FILED DEC. 14, 1907.
934,325.
Patented Sept. 14, 1909.
11 SHEETS—SHEET 2.
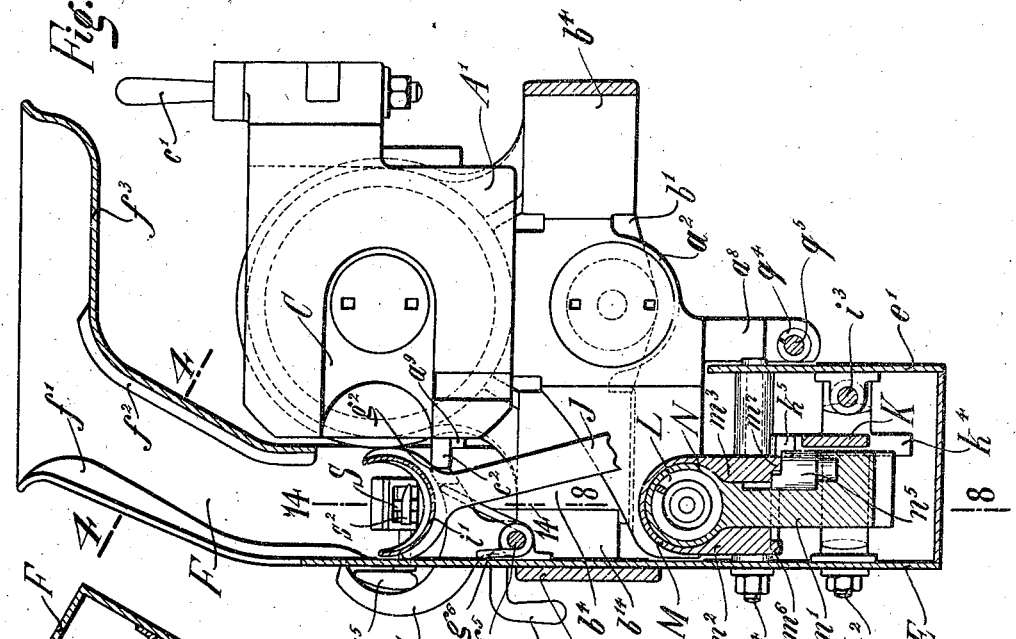
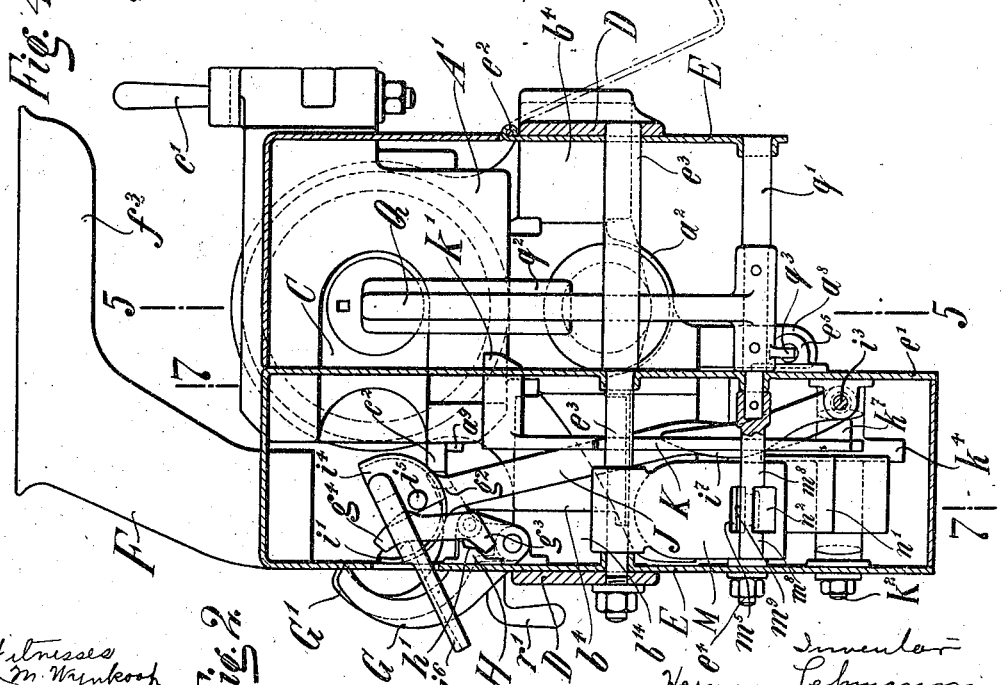

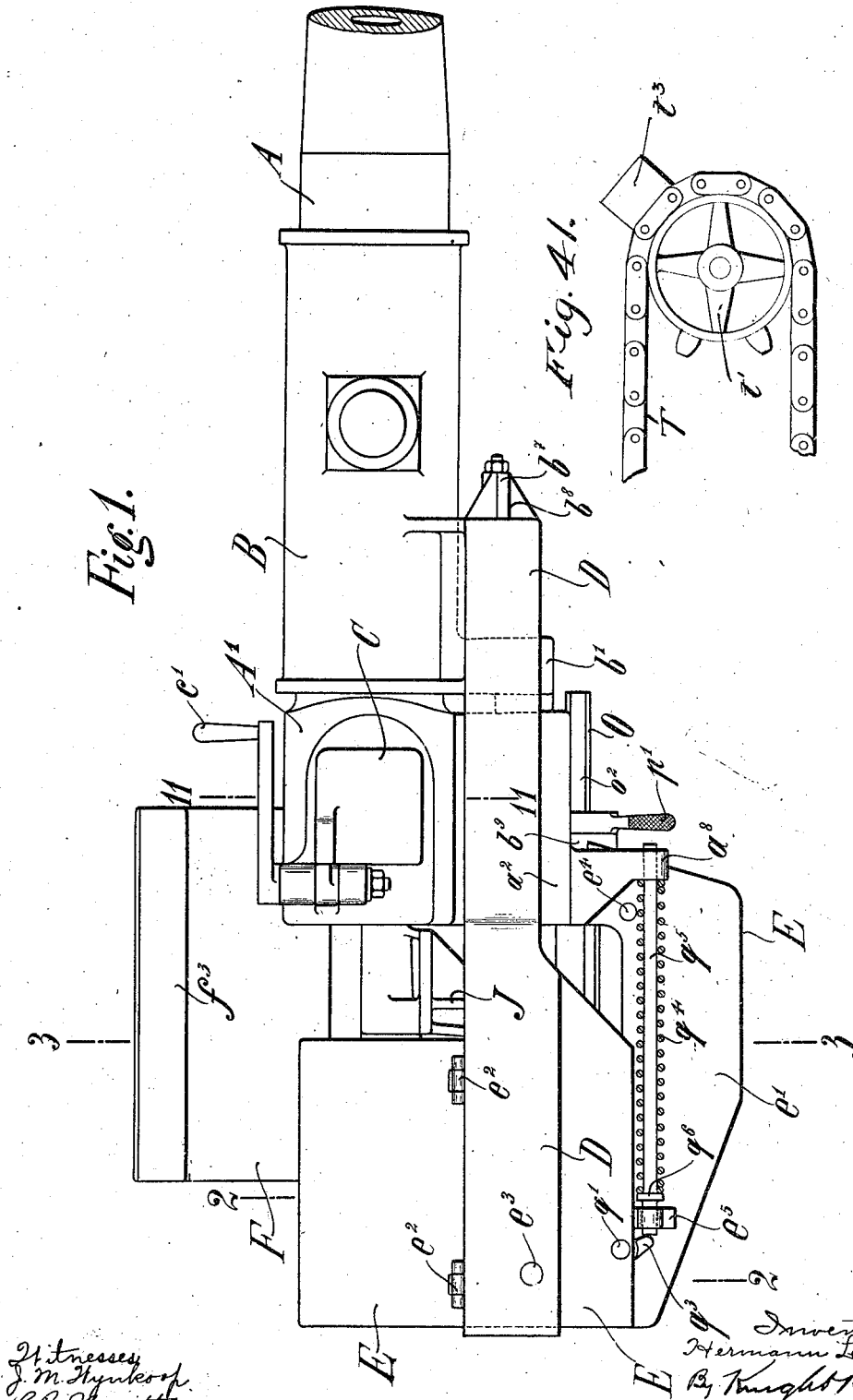

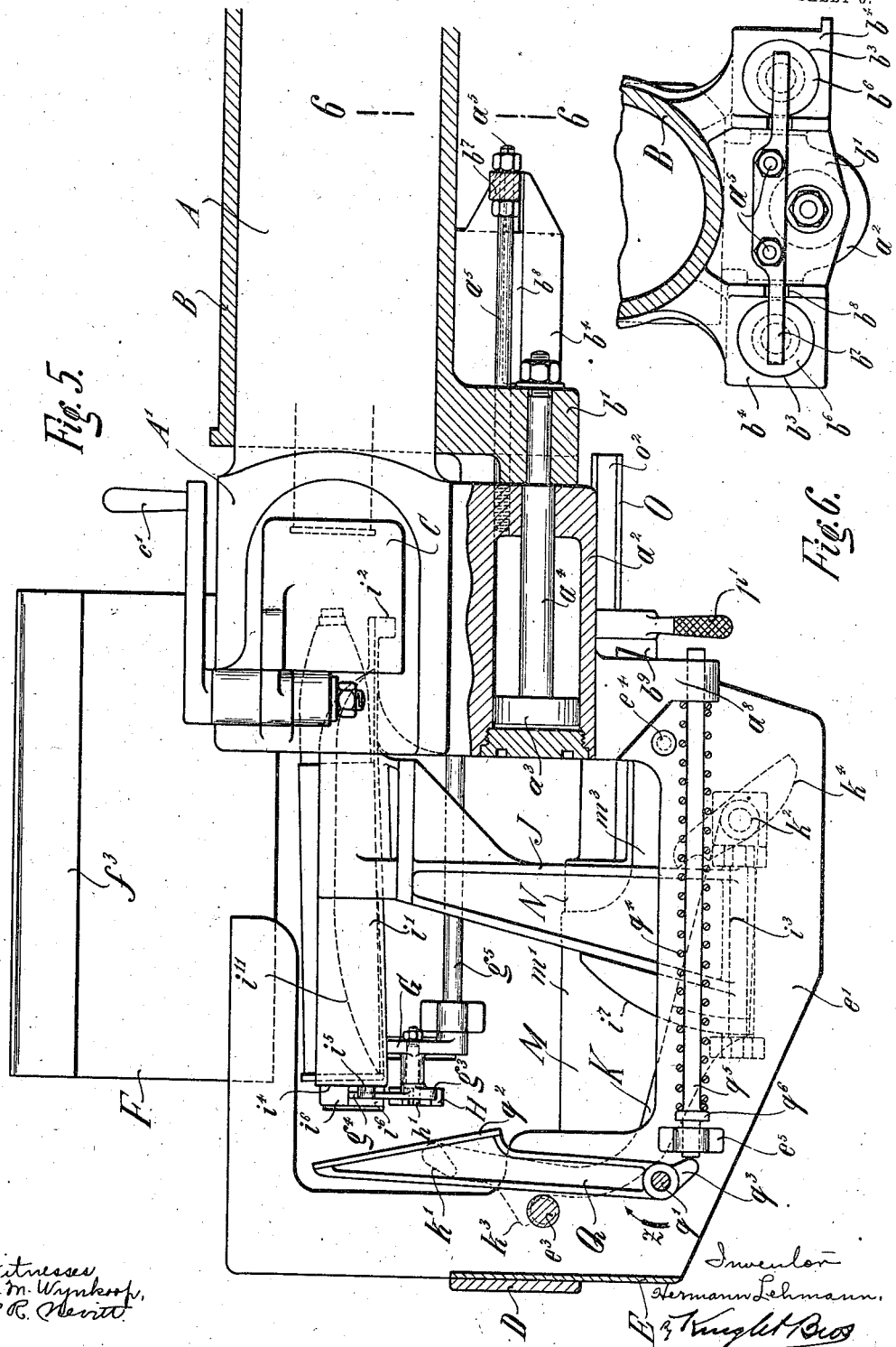

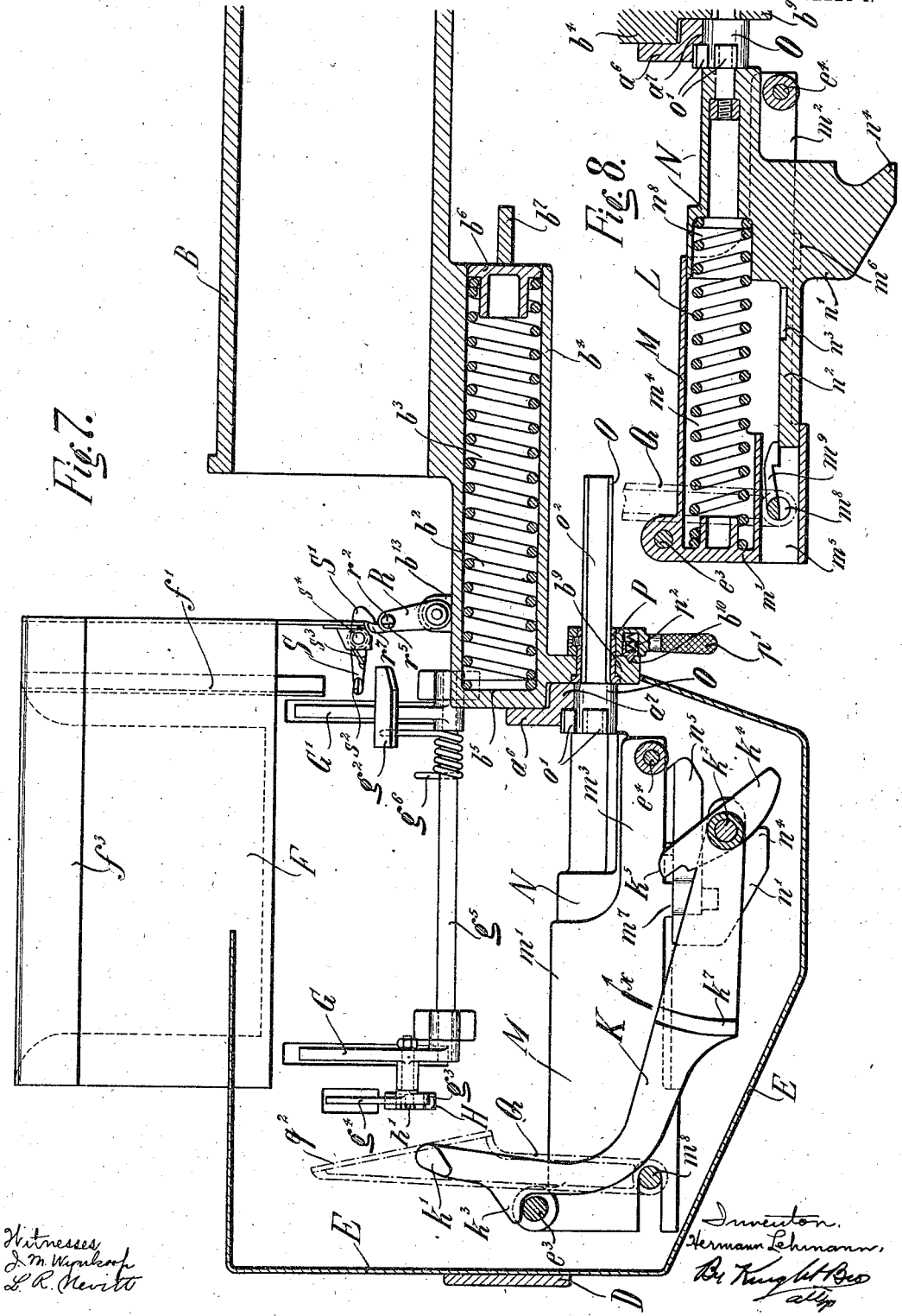

H. LEHMANN.
SELF LOADING RECOIL GUN.
APPLICATION FILED DEC. 14, 1907.
934,325.
Patented Sept. 14, 1909.
11 SHEETS—SHEET 5.
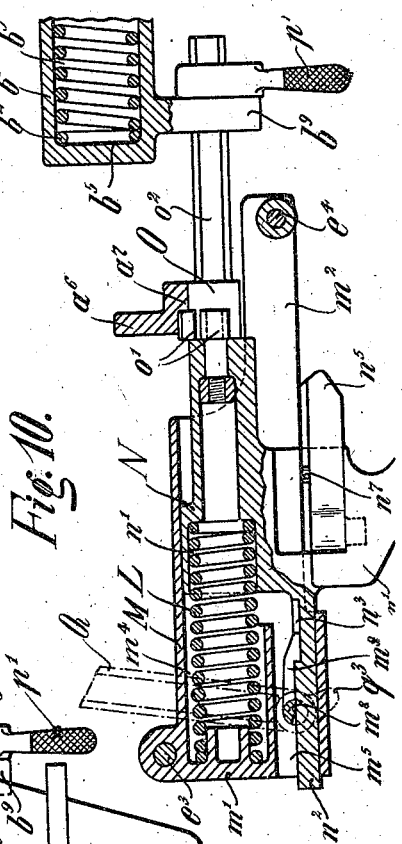
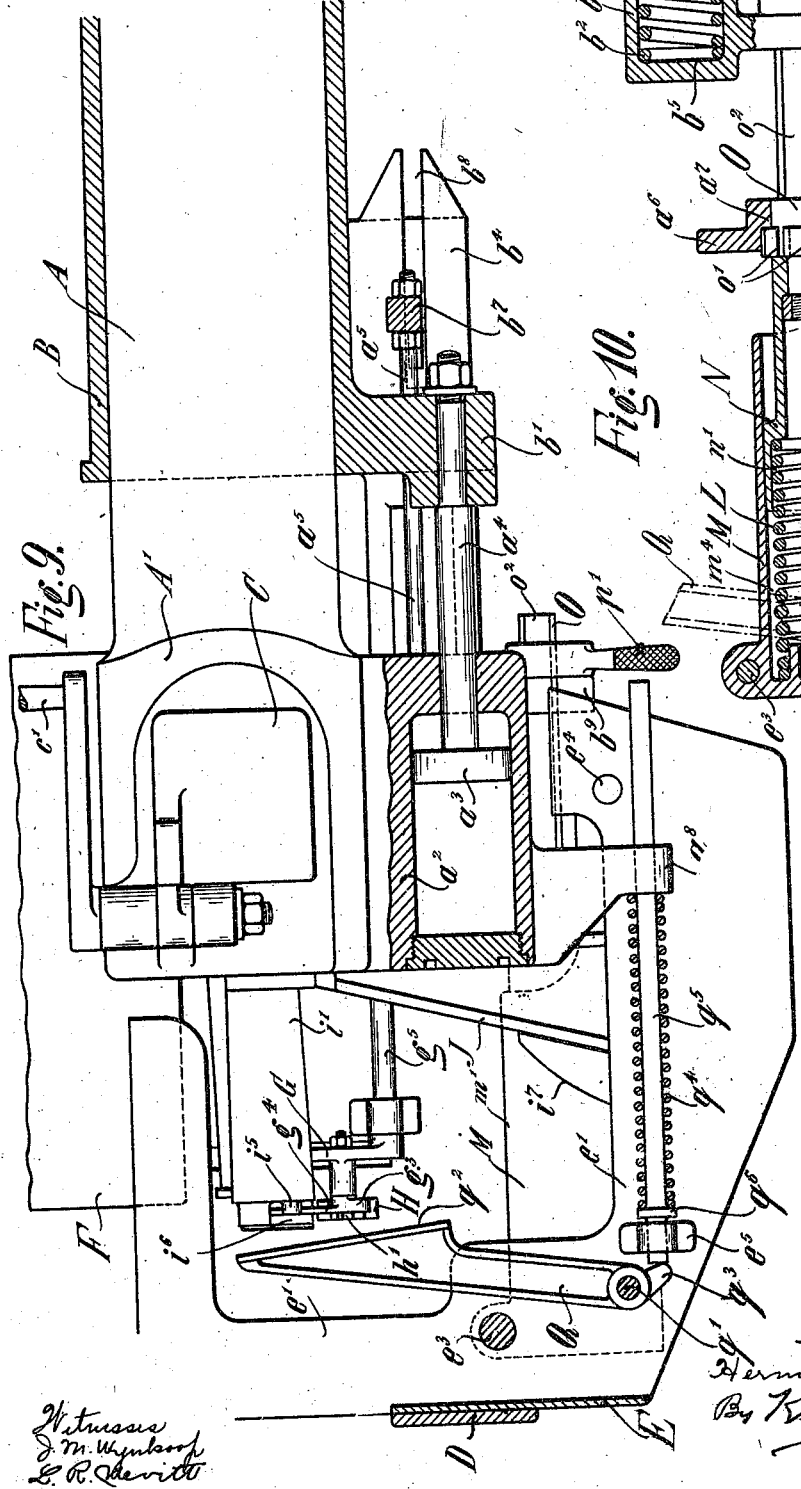

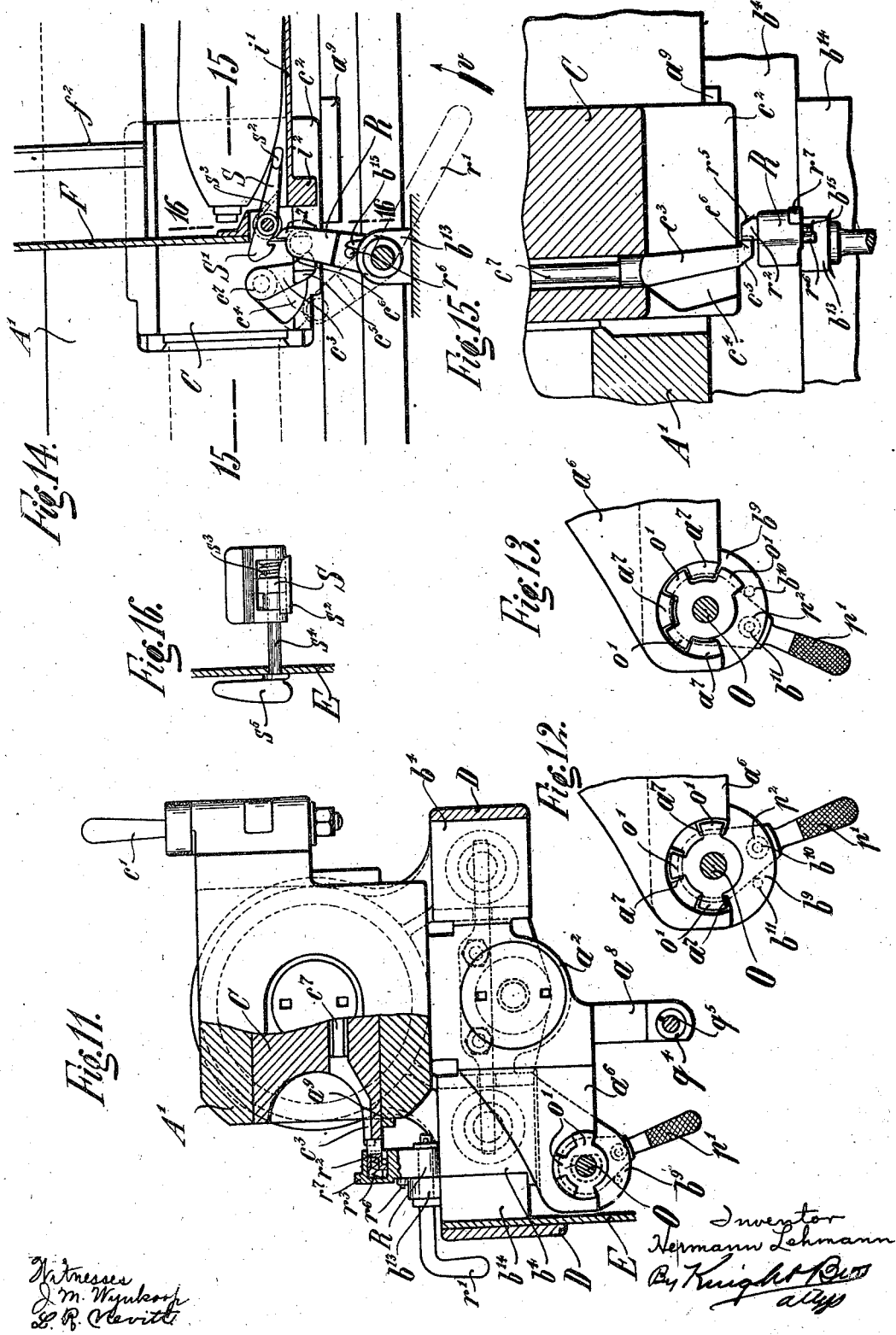

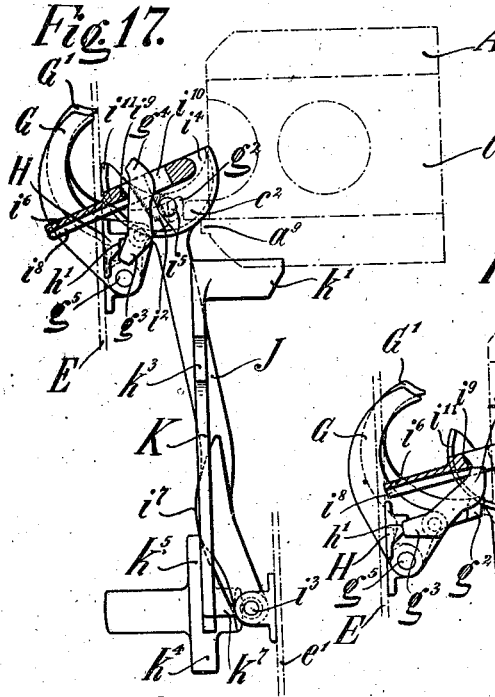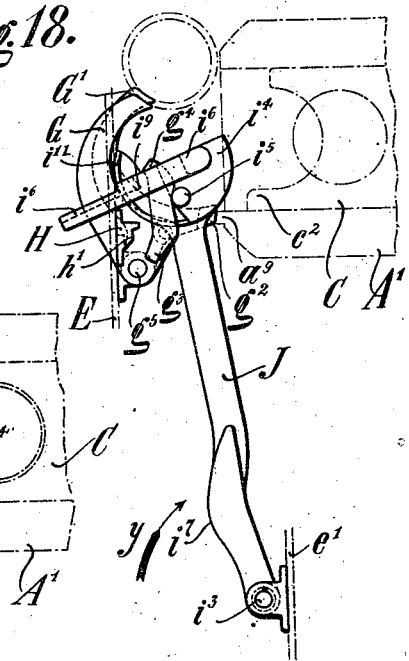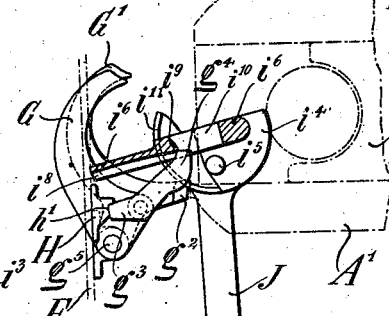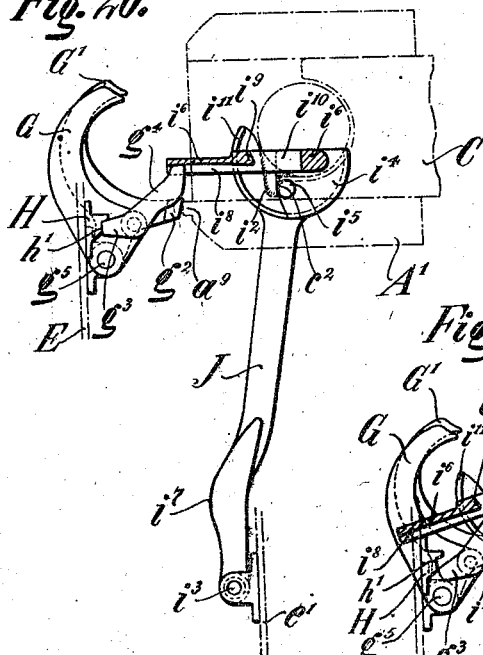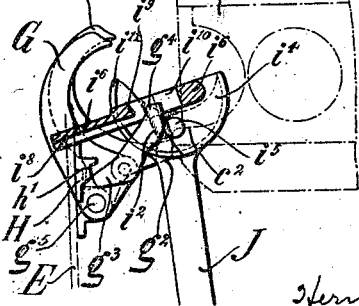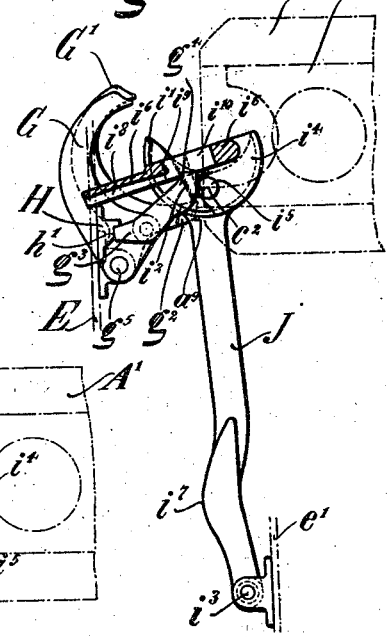

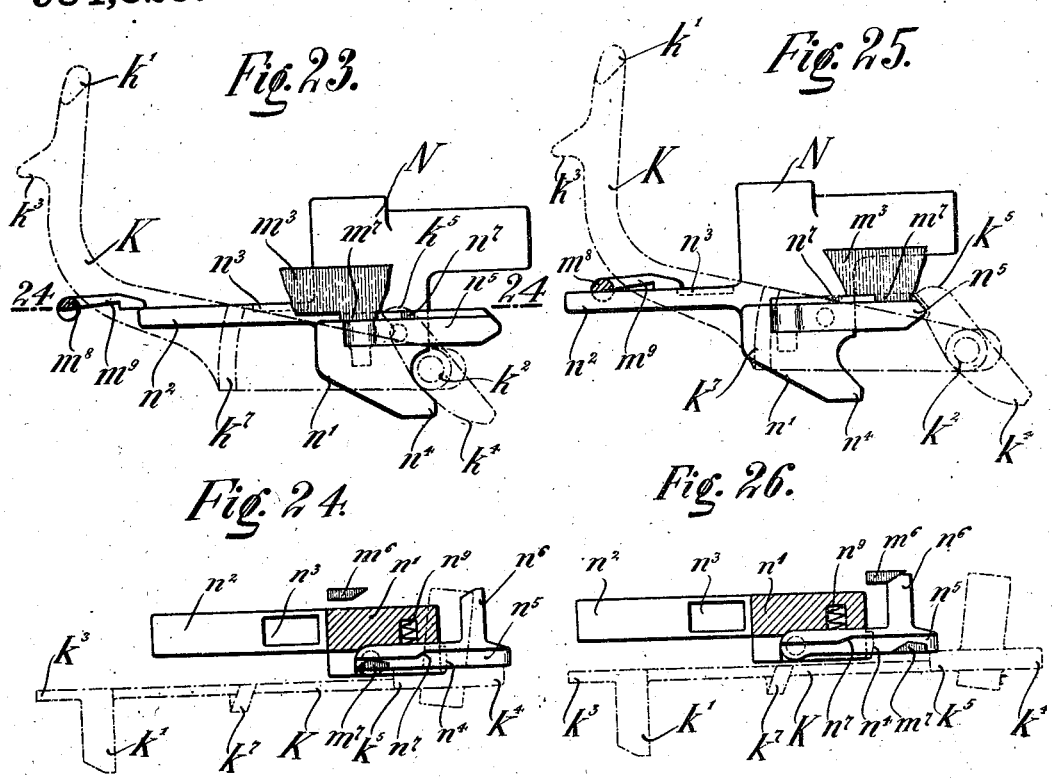

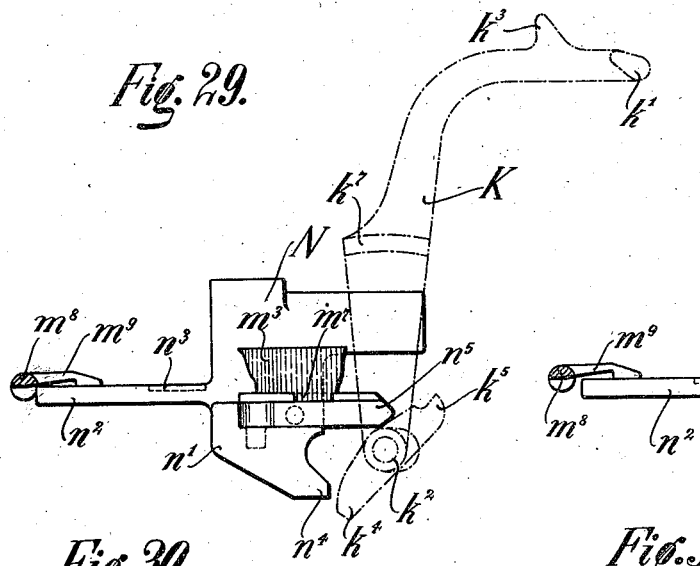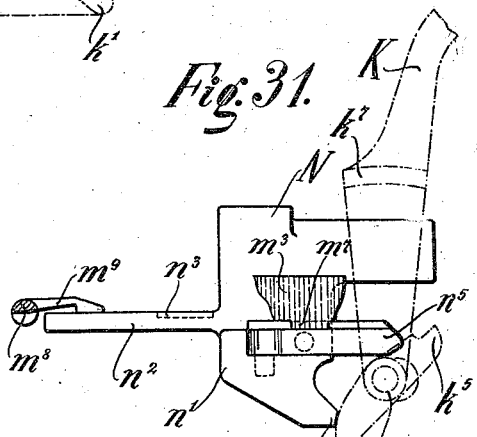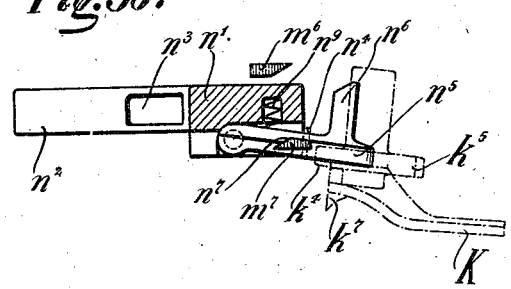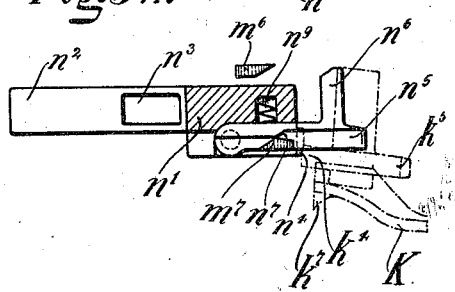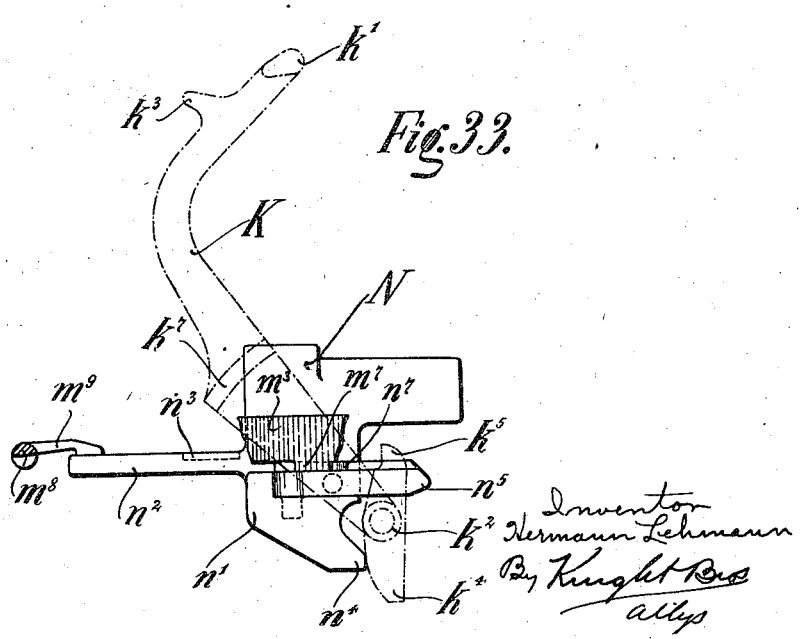

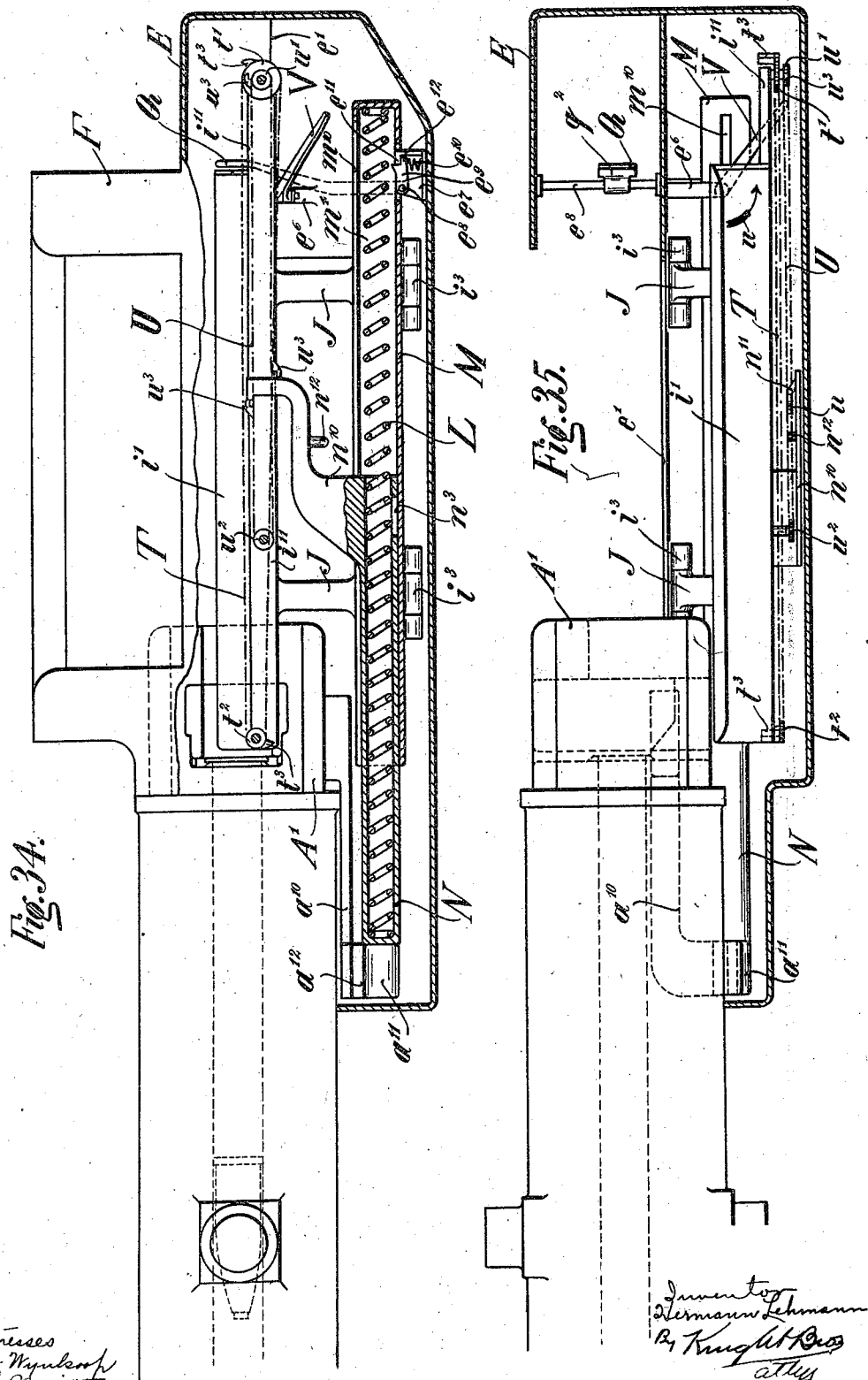

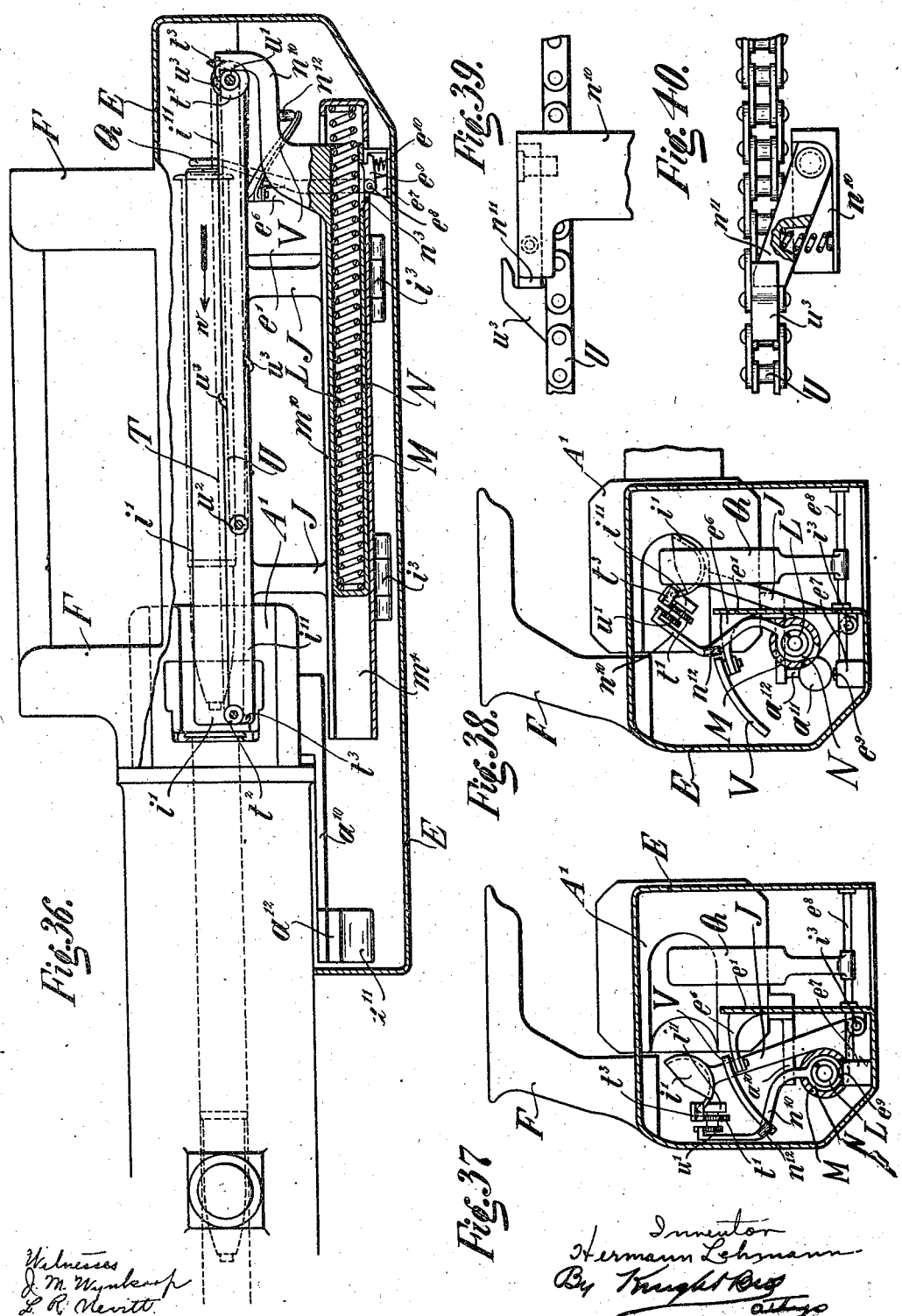

UNITED STATES PATENT OFFICE.

HERMANN LEHMANN, OF MAGDEBURG-SUDENBURG, GERMANY, ASSIGNOR TO FRIED. KRUPP AKTIENGESELLSCHAFT, OF ESSEN-ON-THE-RUHR, GERMANY.

SELF-LOADING RECOIL-GUN.

934,325.

Specification of Letters Patent. Patented Sept. 14, 1909.

Application filed December 14, 1907. Serial No. 406,527.

*To all whom it may concern:*

Be it known that I, HERMANN LEHMANN, a subject of the Emperor of Germany, and a resident of Magdeburg-Sudenburg, Germany, have invented certain new and useful Improvements in Self-Loading Recoil-Guns, of which the following is a specification.

The present invention relates to self-loading recoil-guns of the type in which the cartridge is first conveyed behind the gun-barrel by a carrier and is subsequently introduced into the gun-barrel by a pusher.

In the accompanying drawings, Figure 1 is a side view of one embodiment of the invention; Fig. 2 is a section on line 2—2, Fig. 1, looking from the left; Fig. 3 is a section on line 3—3, Fig. 1, looking from the left; Fig. 4 is a section on line 4—4, Fig. 3, looking from above; Fig. 5 is a section on line 5—5, Fig. 2, looking from the right; Fig. 6 is a section on line 6—6, Fig. 5, looking from the right; Fig. 7 is a section on line 7—7, Fig. 2, looking from the right; Fig. 8 is a section on line 8—8, Fig. 3, looking from the right; Fig. 9 is a section corresponding to Fig. 5, the position of the parts being changed; Fig. 10 is a section corresponding to Fig. 8, the positions of the parts being changed; Fig. 11 is a rear view of the breech and some other parts, partly in section on line 11—11, Fig. 1; Fig. 12 shows a part of Fig. 11 on an enlarged scale; Fig. 13 is a view corresponding to Fig. 12, the positions of the parts being changed; Fig. 14 is a section on line 14—14, Fig. 3, on an enlarged scale and looking from the left; Fig. 15 is a section on line 15—15, Fig. 14, looking from above; Fig. 16 is a section on line 16—16, Fig. 14, looking from the right; Figs. 17 to 22 are views corresponding to Fig. 2, and showing a part of the loading mechanism in different positions; Fig. 23 shows diagrammatically another part of the loading mechanism in a side view corresponding to Fig. 7; Fig. 24 is a section on line 24—24, Fig. 23, looking from above; Figs. 25 to 33 are diagrammatic views corresponding to Figs. 23 and 24, and show different positions of the parts; furthermore, Fig. 34 is a side view of another embodiment of the invention; Fig. 35 is a top view of Fig. 34; Fig. 36 is a corresponding side view, the positions of the parts being changed; Fig. 37 is a corresponding rear view, partly in section; Fig. 38 is a view corresponding to Fig. 37, the positions of the parts being changed; Fig. 39 is a side view of a detail on an enlarged scale, and Fig. 40 is the top view corresponding to Fig. 39. Fig. 41 is a detail elevation of the chain cartridge pushing device shown in Figs. 34, 35, and 36.

Reference will first be had to the embodiment shown in Figs. 1 to 33, and some general remarks as to the construction and mode of operation of the gun will first be made in order that the invention may be more easily understood.

The gun-barrel is provided with a horizontal wedge-closure having operating lever and a device for automatically opening and closing the closure is also provided. The last-named device may be of any suitable type and is not shown in the drawings in order to avoid making the drawings too complex. The device for automatic loading, which forms the subject-matter of the invention, consists mainly of the following parts: The feed hopper, the supporting device, the carrier, the pusher and the device for moving the pusher, the latter device being under the influence of a loading spring. With the device for automatic loading is connected a trigger locking device which prevents the percussion-lock being operated when the last cartridge has been taken from the feed hopper and has been introduced into the gun-barrel. After the gun has been fired the gun-barrel recoils, thereby imparting tension to the loading spring. At the end of the recoil movement a locking device enters into engagement with the loading spring and holds it in the compressed position. When the barrel has returned to firing position the closure opens and at the same time the supporting device reaches its locking position under the action of a spring. The empty shell of the spent cartridge is ejected and withdraws the locking device for the loading spring. The loading spring then expands and imparts movement to the pusher which, at the beginning of its movement, swings the carrier from the cartridge-receiving position to the loading position. During its swinging movement the carrier holds the supporting device in the locking position. When the carrier has reached loading position the pusher hits the cartridge located in the carrier, shoves it into the gun-barrel and returns to its position of rest. During the closing movement of the closure the carrier is swung back by the breech-block into its cartridge-receiving position. Shortly before the carrier has reached this position the supporting device is moved from its locking position by the breech-block. A fresh cartridge can then drop into the loading tray. These general statements having been made the gun will now be described in detail.

The gun-barrel A is slidably mounted in the cradle B. A brake-cylinder $a^2$ (Figs. 5 and 9) is provided on the under side of the breech A' of the gun-barrel. The brake-cylinder serves for braking the recoil and return movement of the gun-barrel and slides on a piston $a^3$ which through the medium of a piston-rod $a^4$ is connected with a horn $b'$ on the cradle. Two springs $b^2$ (Fig. 7) serve for returning the gun-barrel from the recoil position to the loading position. These springs are arranged in the bores $b^3$ of two casings $b^4$ of rectangular cross-section, the casings being secured to the cradle, one on each side of the horn $b'$. The springs $b^2$ have one end abutting against the fixed end wall $b^5$ of their casings and have their other end abutting against a disk $b^6$ which is slidably mounted in the casing. The disk $b^6$ abuts against a cross-piece $b^7$ (Figs. 5, 6 and 9) which by means of rods $a^5$ is rigidly secured to the brake cylinder $a^2$ mounted on the breech of the gun-barrel, the rods $a^5$ passing through bores in the horn $b'$. In the opposing sides of the casings $b^4$ slits $b^8$ are provided in which the cross-piece $b^7$ can slide during the recoil and return movement of the gun-barrel.

In the firing position of the gun-barrel the parts just described assume the positions shown in Figs. 5 to 7 and at the end of the recoil they assume the positions shown in Fig. 9. Through the medium of mechanism not shown in the drawings, the horizontal wedge-closure with operating lever is automatically opened when the gun-barrel has returned to firing position and after loading has taken place the closure is automatically closed.

C designates the wedge breech-block and $c'$ designates the handle of the operating lever. In the breech-block is arranged a percussion-lock with continuous pull mechanism, the drawing showing only the trigger $c^3$ which is secured on a shaft $c^7$ (Figs. 11, 14, and 15). The percussion-lock may be of any suitable construction. The trigger $c^3$ is rotatably mounted in a recess $c^4$ in the lower wall of the loading opening of the breech-block and is of such shape that it does not project beyond the circumference of the loading opening (Fig. 11). The free end of the trigger $c^3$ is provided with a face $c^6$ and with an inclined face $c^5$. A lever R having a handle $r'$ (Figs. 7, 11, 14 and 15) serves for operating the trigger $c^3$. The shaft of the lever R is journaled in a bearing $b^{13}$ which is secured on a block $b^{14}$ connected to the left-hand casing $b^4$ for the recuperating springs. A spring (not shown) tends to hold the lever R in the position shown in Figs. 14 and 7 in which a pin $r^6$ on the lever lies against a stop $b^{15}$ on the bearing $b^{13}$. A bolt $r^2$ (Figs. 11 and 15), which on its rear side is provided with an inclined face $r^5$, is arranged in the lever R and can slide in a direction parallel to the shaft of the lever R. A spring $r^3$ tends to hold the bolt $r^2$ in the position shown in the drawings. When the gun-barrel is in the firing position the bolt $r^2$ lies against the face $c^6$ of the trigger $c^3$ (Figs. 14 and 15). When the gun is to be fired the lever R is turned by means of the handle $r'$ in the direction of the arrow $v$ (Fig. 14), the bolt $r^2$ carrying the trigger $c^3$ along. When the lever R and the trigger $c^3$ have reached the positions shown in dotted lines in Fig. 14 the firing pin of the percussion-lock moves forwardly, and at the same time the bolt $r^2$ slides out of engagement with the trigger $c^3$. Under the action of the repeating spring of the percussion-lock the trigger $c^3$ then swings back to its original position while the gun-barrel carries out the first part of its recoil movement. If the hold on the handle $r'$ of the lever R is then released the lever R also swings back to its position of rest under the action of its spring (not shown). During the return movement of the gun-barrel the inclined face $c^5$ of the trigger hits the inclined face $r^5$ of the bolt $r^2$ and while sliding along thereon forces the bolt back into the lever R. When the trigger has passed the bolt $r^2$ the latter is again projected forwardly under the action of its spring $r^3$, and during this proceeding the lever R is held in its position of rest by its spring (not shown) which to that end has sufficient tension.

On a cradle is mounted a frame D (Figs 1 to 3) which carries the housing E for the loading device and which is secured to the outer longitudinal sides of the two casings $b^4$ for the recuperator springs. The housing E consists of two compartments which are partially separated from one another by a partition $e'$. The compartment which is toward the right, when looking from the breech to the muzzle, is open at the bottom (Fig. 2). The upper wall of this compartment is jointed to the lower wall by means of a hinge $e^2$ and can be folded down into the position shown in dotted lines in Fig. 2. The left compartment is closed at the bottom and carries the cartridge feed hopper F at its top. The cross-section of the hopper is in the form of a rectangle one side of which corresponds to the length of the cartridge and the other side of which corresponds to the diameter of the rim of the shell of the cartridge. As the projectile is of smaller diameter than the rim of the shell the front part of the hopper is provided with guide-rails $f'$ $f^2$ (Figs. 3 and 4) on which the projectiles can slide. In this manner provision is made for having the cartridges located exactly above one another in the hopper. The hopper is provided with a receiving tray $f^3$ which extends over the breech of the gun-barrel and over the right-hand compartment of the housing E and in which the cartridges can be placed preparatory to being pushed into the hopper. In this manner the systematic introduction of the cartridges into the hopper is to a certain extent facilitated. Furthermore, the holding space of the feed hopper is increased by the receiving tray.

Below the feed hopper two supporting levers G G' are mounted on a shaft $g^5$ which levers can swing into the hopper in such a manner that they secure the cartridges in the hopper against dropping down (Fig. 18). A spring $g^6$, which surrounds the shaft $g^5$ and which has one end abutting against the wall of the housing E while its other end abuts against a projection $g^2$ on the forward supporting lever G', (Figs. 3 and 7), tends to swing the supporting levers G G' into the hopper. When the supporting levers are in their supporting position the projection $g^2$ lies against a rail $a^0$ on the breech in such a manner that it projects into the path of an extension $c^2$ on the breech-block (Figs. 18 to 22). When the closure is closed the supporting levers are prevented from swinging into the hopper because the projection $g^2$ lies against the extension $c^2$ on the breech block (Figs. 2, 3 and 17). On the rear supporting lever G a double-armed lever $g^3$ $g^4$ is rotatably mounted. When the supporting device is in the supporting position shown in Figs. 18 to 22, the short arm $g^3$ of the double-armed lever can swing into the notch $h'$ of a lug H secured to the housing E thereby preventing the supporting levers from accidentally swinging back into their inactive position (Fig. 20). The purpose of the long arm $g^4$ of the double-armed lever $g^3$ $g^4$ will be explained later on.

The carrier J, which has a loading tray $i'$ on its upper end, is pivoted on a shaft $i^3$ which is mounted in the lower part of the partition $e'$ and extends parallel to the axis of the bore of the gun-barrel. In the cartridge-receiving position of the carrier (Figs. 2, 3, 17 and 18) the loading tray is located beneath the feed hopper F and lies against the housing E. It is held in this position by the weight of the carrier. The carrier can be swung about its shaft $i^3$ in such a manner that it reaches the position shown in Fig. 20, the loading position, when the closure is opened. When the carrier assumes this position the front part of the loading tray is located within the loading openings of the breech and breech-block and lies against the walls of the loading openings. The wall $i^{11}$ of the loading tray $i'$ that lies toward the supporting levers G G' is of arcuate shape in the manner shown in Fig. 5 and for a purpose which will be explained later on.

On the forward end of the loading tray $i'$ is located a downwardly directed projection $i^2$ which, when the carrier is in the loading position, engages the extension $c^2$ on the breech-block (Fig. 20). When the closure is being closed the carrier is swung back to the cartridge-receiving position by the breech-block through the medium of the projection $i^2$. The rear end of the loading tray is partially closed by a wall $i^4$, on which are arranged a pin $i^5$ and a guide-rod $i^8$ (Figs. 2 and 17 to 22) both of which are adapted to coöperate with the long arm $g^4$ of the double-armed lever $g^3$ $g^4$. The guide-rod $i^8$ is provided with a downwardly directed slot $i^{10}$ and in its under side the guide-rod has a groove $i^8$ which communicates with the slot. The edge at the junction of the slot $i^{10}$ and the groove $i^8$ will in the following be referred to as the nose $i^9$. When the carrier J is in the cartridge-receiving position the lever-arm $g^4$ projects through the slot $i^{10}$ (Figs. 17 and 18). While the carrier swings in the direction of the arrow $y$ (Fig. 18) the nose $i^9$ first abuts against the lever-arm $g^4$ and turns it in such a manner that the lever-arm $g^3$ enters the notch $h'$. The nose $i^9$ thereupon slides away from the lever-arm $g^4$ (Fig. 19) and the groove $i^8$ engages with the arm $g^4$. The groove $i^8$ remains in engagement with the lever-arm $g^4$ and holds it in its new position during the further swinging movement of the carrier (Fig. 20). In the proximity of the shaft $i^3$ the carrier J is provided with a guide-face $i^7$ (Figs. 2, 5 and 17 to 22) by means of which the carrier can be swung from the cartridge-receiving position to the loading position in a manner to be explained later on.

The cartridge-pusher K is formed by a long lever which is bent substantially at a right angle and which is pivoted on a shaft $k^2$ which is mounted horizontally in the housing E (Figs. 2, 7, 17 and 23 to 33). The pusher is provided with a laterally projecting finger $k'$ which, during the insertion of the cartridge, engages behind the cap of the cartridge. The shaft $k^2$ of the pusher K extends at an inclination to the vertical plane through the axis of the bore of the gun-barrel in such a manner that, when the pusher is in the position of rest (Figs. 2, 7, and 17), the finger $k'$ is located outside of the path of the shell which is ejected when the closure is opened. However, when the finger pusher is swung to a slight extent the finger $k'$ approaches the aforesaid plane to such an extent that the finger can engage behind the cap of a cartridge which is located in continuation of the axis of the bore of the barrel. The pusher is provided with a nose $k^3$ by means of which it rests on a bolt $e^3$ secured in the housing E when in the position of rest (Fig. 7). On that side of the pusher K which is toward the partition $e'$ an inclined face $k^7$ is provided. The face $k^7$ engages the aforesaid guide-face $i^7$ of the carrier J and coöperates therewith in such a manner that the carrier is swung from the cartridge-receiving position to the loading position when the pusher is swung from its position of rest in the direction of the arrow $a'$ (Fig. 7). The curvature of the guide-face $i^7$ is selected in such a manner that the swinging movement of the carrier has already been completed when the finger $k'$ of the pusher reaches the proximity of the rear end of the loading tray $i'$. During the further turning of the pusher the finger $k'$ can then engage the rim of a cartridge in the loading tray and push the cartridge into the gun-barrel, the finger swinging over the arcuate edge of the wall $i^{11}$ of the loading tray. As will be fully explained later on the turning movement of the pusher is effected by means of two oppositely directed cams $k^4$ and $k^5$ (Figs. 7 and 23 to 33) provided on the nave of the pusher.

In the left compartment of the housing E a spring-housing M serving for holding the loading spring L is secured by means of two bolts $e^3$ and $e^4$. The housing consists of a body $m'$ (Figs. 2, 5 and 7 to 10) and two guide-rails $m^2$ $m^3$ extending therefrom. The part $m'$ is provided with a bore $m^4$ (Figs. 8 and 10) which is open toward the front and which has its rear wall forming an abutment for the loading spring L. On the under side the part $m'$ is cut out throughout a portion of its length (Figs. 8 and 3). The portion which is not cut out is provided with a pocket $m^5$ of rectangular cross-section which extends parallel to the bore $m^4$. In the pocket $m'$ is arranged a latch $m^9$ which is journaled in the side walls of the pocket through the medium of two trunnions $m^8$. The latch is of such shape that, when withdrawn, (Fig. 8), it does not project into the lower half of the pocket $m^5$.

In the spring-housing M is slidably mounted a slide N which is guided partially in the cylindrical bore $m^4$ and partially by the guide-rails $m^2$ $m^3$. The slide is provided with a cylindrical bore $n^8$ (Figs. 8 and 10) which is open toward the rear and the end wall of which forms the other (movable) abutment for the loading spring L. On its under side the slide N carries a horn $n'$ which projects downwardly between the guide-rails $m^2$ and $m^3$ (Figs. 2, 3, 7, 8 and 10). A rod $n^2$ of rectangular cross-section extends rearwardly from the horn $n'$ and is guided in the pocket $m^5$ below the latch $m^9$. The rod $n^2$ is provided with a notch $n^3$ in which the latch $m^9$ can engage when the slide N assumes its rearmost position. The horn $n'$ of the slide N is provided with an integral finger $n^4$ and has a finger $n^5$ which can turn about a vertical axis. The finger $n^4$ is adapted to coöperate with the cam $k^4$ of the pusher and is always located in the path of movement of the cam $k^4$. The rotatable finger $n^5$ is adapted to coöperate with the cam $k^5$ of the pusher. When the slide N is in the position of rest the finger $n^5$ is located outside of the path of movement of the cam $k^5$. During the rearward movement of the slide the finger $n^5$ is swung into the path of movement of the cam $k^5$ and during the forward movement of the slide it is again swung out of the path of movement of said cam. For that purpose the finger $n^5$ is provided with a lateral arm $n^6$ and with an inclined face $n^7$ (Figs. 24, 26, 28, 30 and 32). The arm $n^6$ coöperates with a striker $n^6$ arranged on the under side of the guide-rail $m^2$ and the inclined face $n^7$ coöperates with a striker $m^7$ arranged on the under side of the guide-rail $m^3$. A spring $n^9$ supports the swinging movement of the finger $n^5$ into the path of movement of the cam $k^5$ and tends to hold the finger in said path.

A rod O (Figs. 7, 8 and 10) is rotatably but non-slidably connected to the front end of the slide N. That part of the rod O which is toward the slide is provided with lugs $o'$ on its circumference. The lugs $o'$ correspond to lugs $a^7$ which are provided on an arm $a^6$ connected with the breech A' of the gun-barrel (Figs. 7, 8 and 10 to 13). The remaining part of the rod O is of smaller diameter than the part located adjacent to the slide N and has a flattened portion $o^2$ extending throughout its length. This part of the rod O is slidably but non-rotatably connected with a guide P which is rotatably mounted in a projection $b^9$ on the left-hand casing $b^4$ for the recuperator-springs. The guide P and the rod O can be turned by means of a handle $p'$ which acts as a shifting lever (Figs. 1, 7, 9 to 13). In the handle $p'$ is arranged a spring-pressed bolt $p^2$ (Fig. 7) for which two notches $b^{10}$ and $b^{11}$ are provided in the projection $b^9$. When the bolt $p^2$ engages in the notch $b^{10}$ the lugs $o'$ are located behind the lugs $a^7$ of the arm $a^6$ and the rod O and the slide N are therefore carried along with the arm $a^6$ when the gun-barrel recoils (Figs. 11 and 12). When the handle $p'$ is turned to bring the bolt $p^2$ into engagement with the notch $b^{11}$ the lugs $o'$ are located behind the spaces between the lugs $a^7$ (Fig. 13). In this case the recoil of the gun-barrel has no effect on the rod O and the slide N as the lugs $a^7$ can move between the lugs $o'$ and slide over the front part of the slide N.

The trunnion $m^8$ of the latch $m^9$ which is nearest the partition $e'$ of the housing E projects outside of the spring-housing M and is rigidly connected to a shaft $q'$ (Fig. 2) which is journaled in the right-hand compartment of the housing E. On the shaft $q'$ is secured a lever Q which is provided with a surface $q^2$ adapted to be engaged by the shell of the cartridge. The lever Q is so formed and so positioned on the shaft $q'$ that the cartridge-shell, which is ejected from the gun-barrel when the closure is opened, can hit the surface $q^2$ with its cap. On the nave of the lever Q is located a cam $q^3$ which lies against a rod $q^5$ (Fig. 5). The rod $q^5$ is guided in a bearing $e^5$ secured on the partition $e'$ and in a projection $a^8$ on the brake-cylinder $a^2$; it is continuously pressed against the cam $q^3$ by means of a helical spring $q^4$ which has one end abutting against the projection $a^8$ while its other end abuts against a collar $q^6$ on the rod $q^5$ (Figs. 1, 5 and 9). The rod $q^5$ therefore tends to turn the lever Q and the latch $m^9$ connected therewith in the direction of the arrow $z$ (Fig. 5) and during the rearward movement of the slide N the latch $m^9$ consequently enters the notch $n^3$. As the tension of the spring $q^4$ is considerably increased on the recoil of the gun-barrel the latch is certain to enter the notch $n^3$ in spite of the vibrations caused by firing the gun. The empty shell, which is ejected when the closure is opened and which hits the surface $q^2$, turns the lever Q in the direction contrary to that of the arrow $z$ (Fig. 5) thereby causing the latch $m^9$ to be withdrawn from the notch $n^3$ of the slide.

The following arrangement is provided in order to prevent the gun from being fired when the last cartridge in the hopper has been removed from the hopper and has been introduced into the gun-barrel. In the front wall of the hopper F is mounted a double-armed lever S S' (Figs. 7 and 14) which is rotatable about a horizontal axis at right angles to the axis of the bore of the gun-barrel. The short arm S' of the double-armed lever, which projects outside of the hopper is formed as a hook and can engage over a nose $r^7$ on the lever R in such a manner that it prevents the said lever from turning to pull the percussion-lock, that is to say it prevents it from turning in the direction of the arrow $v$, Fig. 14. A spring $s^3$ tends to hold the double-armed lever in its locking position. The long arm S of the double-armed lever projects into the hopper F and is provided with a plate $s^2$. When the carrier J is in the cartridge-receiving position the arm S is located directly above the front end of the loading tray $i'$ (Fig. 14), and a cartridge located in the loading tray lies with the projectile-point on the plate $s^2$ and holds the double-armed lever S S' against the pressure of the spring $s^3$ in such a position that the lever arm S' is out of engagement with the nose $r^7$. When the carrier swings into the loading position the double-armed lever S S' again swings back to the locking position under the action of the spring $s^3$ as soon as the projectile-point has left the plate $s^2$. When the last cartridge has been introduced into the gun-barrel and no fresh cartridge can drop into the loading tray $i'$ the lever R and consequently also the trigger-mechanism of the percussion-block remains locked. In order to make it possible also in this instance to pull the percussion-lock the shaft $s^4$ of the double-armed lever S S' is passed through the outer side-wall of the housing E (Figs. 3 and 16) and is provided with a handle $s^5$ by means of which the lever arm S' can be turned out of engagement with the lever R.

The mode of operation of the gun is as follows: Let it be assumed that the gun is loaded, the loading tray $i'$ and the feed-hopper F filled and the shifting lever $p'$ in such a position that the lugs $o'$ lie behind the lugs $a^7$. After the percussion-lock has been pulled by turning the handle $r'$ in the direction of the arrow $v$ (Fig. 14) and the gun has been fired the gun-barrel recoils on the cradle B and through the medium of the lugs $a^7$ $o'$ the arm $a^6$ carries the slide N along, thereby imparting tension to the loading spring L. Furthermore the finger $n^5$ mounted on the slide N is brought into the path of movement of the cam $k^5$ of the pusher K (Figs. 23 to 28) through coöperation of the arm $n^6$ of the finger $n^5$ and the striker $m^6$ of the spring-housing M. The latter movement is supported by the spring $n^9$. At the end of the recoil movement the spring $q^4$, to which greater tension has also been imparted by the recoil, causes the latch $m^9$ to swing into the notch $n^3$ in the slide N, the lever Q partaking of the swinging movement of the latch. At that moment the several parts of the gun assume the positions shown in Figs. 9, 10, 27 and 28. During the return movement of the gun-barrel the spring $q^4$ again expands. The trigger $c^3$ hits the bolt $r^2$ with its inclined face $c^5$ and while passing beyond the lever R presses the bolt $r^2$ into the lever R. When the return movement of the gun-barrel has been completed the closure opens and under the action of the spring $g^6$ the supporting levers G G' swing into the hopper F and lodge below the lowermost cartridge in the hopper, thereby securing the cartridges against dropping down, see Figs. 17 and 18. At the same time the empty shell of the spent cartridge is ejected. With its cap the shell hits the surface $q^2$ of the lever Q and turns the lever in the direction opposite to the arrow $z$ (Fig. 5) whereby the latch $m^3$ is withdrawn from the notch $n^3$. The loading spring L then expands and moves the slide N forwardly, whereby the finger $n^5$ hits the cam $k^5$ on the pusher K and turns the pusher on its shaft $k^2$ (see Figs. 27 to 32). During the first part of its turning movement the pusher swings the carrier from the cartridge-receiving position to the loading position through the medium of the inclined face $k^7$ on the pusher and the guide-face $i^7$ on the carrier, and thereupon the finger $k'$ of the pusher hits the cap of the cartridge in the carrier and pushes the cartridge into the gun-barrel.

During the swinging movement of the carrier J the following proceeding has taken place in the supporting device. The nose $i^5$ of the guide-rod $i^6$ has placed itself against the lever-arm $g^4$ and, while sliding along the same, has turned the double-armed lever $g^3$ $g^4$ in such a manner that the lever-arm $g^3$ has moved into the notch $h'$ (Fig. 19). The end of the lever-arm $g^4$ has thereupon passed into engagement with the groove $i^8$ in the guide-rod $i^6$ and the walls of the groove $i^8$ have moved along the lever-arm $g^4$ until, at the end of the swinging movement of the carrier J, the parts in question assume the positions shown in Fig. 20. The lever-arm is therefore held in positive engagement with the notch $h'$ during the swinging movement of the carrier and the supporting levers are consequently prevented from returning to their inactive position. Short time before the pusher K has pushed the cartridge completely into the gun-barrel the inclined face $n^7$ of the finger $n^5$ has hit the striker $m^7$ on the spring-housing M and has moved along in contact therewith (Figs. 29 to 32). This has caused the finger $n^5$ to be swung in such a manner that, when the insertion of the cartridge is completed, the finger has moved out of the path of movement of the cam $k^5$ on the pusher (Fig. 32). At that time the cam $k^4$ and the finger $n^4$ have come into engagement with each other (Fig. 31). The loading spring L has then given off only a part of its tension and while it expands further it turns the pusher K back to its original position through the medium of the cam $k^4$ and the finger $n^4$, see Figs. 33, 23 and 24. The closure then closes and by means of its extension $c^2$ and the projection $i^2$ the breech-block turns the carrier J back. When, during this movement, the breech-block and the carrier have reached the position shown in Fig. 21 the pin $i^5$ hits the double-armed lever $g^3$ $g^4$, the arm $g^4$ of which short time prior thereto has passed out of engagement with the groove $i^8$, and turns the arm $g^3$ out of the notch $h'$. As soon as this has been done (Fig. 22) the extension $c^2$ on the breech-block hits the projection $g^2$ on the supporting lever G', returns the supporting levers G G' to their inactive position (Fig. 17) and holds them in that position, as long as the extension remains in engagement with the projection $g^2$. When the breech-block has completed its movement the carrier J has not quite reached the cartridge-receiving position but its momentum and weight cause it to travel the last part of its path. During the latter proceeding the double-armed lever $g^3$ $g^4$ returns from the position shown in Fig. 22 to that shown in Fig. 17, the arm $g^3$ sliding along the projections of the lug H which form the notch $h'$. The lowermost cartridge in the hopper F, which is released when the supporting levers G G' swing back, drops down on the loading tray $i'$ of the carrier J. As the point of the projectile lodges on the plate $s^2$ of the double-armed lever S S' the lever-arm S' passes out of engagement with the nose $r^7$ on the lever R and the percussion-lock can therefore again be pulled by lifting the handle $r'$. When the percussion-lock is again pulled the proceeding is repeated in the manner just described. If there are no cartridges in the hopper F when the carrier J returns to the cartridge-receiving position the arm S' of the double-armed lever S S' remains in engagement with the nose $r^7$ on the lever R. In this case the pulling of the percussion-lock is prevented and is not made possible until a fresh cartridge has been placed in the hopper or in the loading tray. In this way there is always present in the gun a source of power for the automatic introduction of a fresh cartridge into the gun-barrel. If it is desired to fire the cartridge in the gun-barrel, when there are not any further cartridges in the hopper or in the loading tray, the handle $s^5$ is turned to bring the arm S' of the double-armed lever S S' out of engagement with the lever R and the percussion-lock is thereupon pulled.

The main feature of the improved gun consists in the fact that the carrier and the pusher are driven by the same source of power, which however acts directly only on that one of the two parts which during the loading becomes effective last. By reason of this arrangement there is an absolute guaranty that the loading movements follow each other in the right sequence.

The embodiment shown in Figs. 34 to 40 differs from the first embodiment as to the construction and arrangement of the carrier, the pusher and the device for moving the pusher. The feed hopper, the supporting device and the locking device, which prevents the percussion-lock being pulled when the last cartridge has been taken from the hopper and has been introduced into the gun-barrel, are similar to the corresponding devices of the first embodiment and, with the exception of the hopper, they are therefore not shown in the drawings. Those parts of the second embodiment which correspond to similar parts in the first embodiment are indicated by the same reference characters.

The carrier J is mounted to swing about an axis parallel to the axis of the bore of the barrel through the medium of a pair of hinges $i^3$ arranged on the partition $e'$ of the housing E. The two extreme positions of the carrier are shown in Figs. 37 and 38. In the cartridge-receiving position (Fig. 37) the loading tray $i'$ is located beneath the feed hopper F and in the loading position (Fig. 38) it is located behind the cartridge-seat of the gun-barrel. In this position the front part of the loading tray $i'$ is located within the loading opening of the breech A'. The pusher and the device for moving the pusher are arranged on the carrier. The pusher consists of an endless chain T having two catches $t^3$ and running on chain-wheels $t'$ $t^2$. The chain-wheels $t'$ $t^2$ are journaled in the ends of a rail $i^{11}$ which is secured on the left side-wall of the loading tray $i'$ and which has its rear end projecting beyond the rear end of the loading tray (Figs. 34 to 38). The chain-wheels $t'$ $t^2$ are mounted on the rail $i^{11}$ in such a manner that the catches $t^3$, when they move forwardly due to the turning of the chain-wheels, project into the loading tray and engage the rim of the cartridge in the tray. Furthermore the forward chain-wheel $t^2$ is located so near the forward end of the loading tray that the catch $t^3$, when it moves over the wheel $t^2$ while the cartridge is being inserted, slides along the cap of the cartridge just inserted. The two catches $t^3$ are spaced from one another a distance equal to half the length of the chain T and therefore, when one of the catches moves from the rear to the front the other catch moves in the opposite direction. On the shaft of the rear chain wheel $t'$ is arranged another chain-wheel $u'$ of smaller diameter which is coupled to the chain-wheel $t'$. Furthermore on the front part of the rail $i^{11}$ is journaled a chain-wheel $u^2$ corresponding to the chain-wheel $u'$. A chain U having three catches $u^3$ passes over the chain-wheels $u'$ $u^2$. The chain T is driven by means of the chain U and the ratio of transmission of the chain-wheels $t'$ and $u'$ is selected in such a manner that a catch of the chain T travels through a path of approximately the length of the rail $i^{11}$, or to be more exact a path equal to half the length of the chain T, when a catch of the chain U travels a path equal to the length of the recoil.

On the lower part of the carrier J, near the hinges $i^3$ and parallel to the axis thereof, is secured a hollow cylinder M open toward the front and provided with a slot, the end wall of the cylinder forming one of the abutments for the loading spring L. In the bore $m^4$ of the cylinder M is slidably arranged a second hollow cylinder, the slide N, which is open toward the rear. The end wall of the slide forms the other (movable) abutment for the loading spring L. On its under side the slide N is provided with a notch $n^3$ and on the top it carries an arm $n^{10}$ which projects through the slot $m^{10}$. The arm $n^{10}$ is adapted to enter into engagement with the catches $u^3$ of the chain U and move the chain in the direction of the arrow $w$ (Fig. 36). For that purpose the arm $n^{10}$ is provided with a laterally projecting spring-latch $n^{11}$ (Figs. 39 and 40) which yields to the catches $u^3$ when the slide N moves in the direction of the recoil of the gun-barrel but which engages behind the latches and carries the chain U along when the slide moves in the opposite direction. On the arm $n^{10}$ is located a bolt $n^{12}$ which can coöperate with a deflector V which is mounted on a support $e^6$ secured on the partition $e'$ of the housing E. The deflector can be turned in the direction of the arrow $u$ (Fig. 35) but does not permit of a turning movement in the opposite direction. A spring (not shown) tends to hold the deflector V in the position of rest shown in Fig. 35. The bolt $n^{12}$ is so positioned relatively to the deflector that it forces the deflector aside when the slide N moves in the direction of the recoil of the gun-barrel, and when the slide moves forwardly from its rearmost position the bolt $n^{12}$ engages behind the deflector and slides along thereon. While the bolt $n^{12}$ slides along on the deflector V the slide N and consequently also the hollow cylinder M and the entire carrier J are swung in such a manner that the loading tray $i'$ becomes located behind the gun-barrel. When the swinging movement of the carrier is completed the bolt $n^{12}$ slides off the deflector V (Fig. 38).

For the purpose of imparting tension to the loading spring L an arm $a^{10}$ is arranged on the breech A' and is provided with a neck $a^{12}$ carrying a short piston $a^{11}$. The piston is of slightly smaller diameter than the slide N and is so located that its axis lies in alinement with the axis of the slide N when the carrier is in the cartridge-receiving position. When the loading spring is expanded the slide N lies against the piston $a^{11}$ or against the bent end of the arm $a^{10}$ according to the position of the carrier. When the gun-barrel recoils the slide N is shoved into the hollow cylinder M thereby imparting tension to the spring L and the neck $a^{12}$ passes into the slot $m^{10}$ while the piston $a^{11}$ enters the bore in the cylinder M.

In order that the slide N can be held in its rearmost position a latch $e^9$ is provided which, when the carrier is in the cartridge-receiving position, projects into the cylinder M and can pass into engagement with a notch $n^3$ in the slide. The latch $e^9$ is rotatably mounted on a shaft $e^8$ in a bearing $e^7$ secured on the lower wall of the housing E. A spring $e^{10}$ holds a nose $e^{11}$ on the latch in abutment with a projection $e^{12}$ on the bearing $e^7$ (Fig. 34). The shaft $e^8$ of the latch $e^9$ is passed through the partition $e'$ and is journaled in the same and in the right-hand side-wall of the housing E. On the extension of the shaft $e^8$ is secured a lever Q which is provided with a surface $q^2$ (Fig. 35) and which is of such shape and so located that the empty shell ejected from the gun-barrel when the closure is opened can hit the surface $q^2$.

Let it be assumed that the gun is loaded, the closure closed, the filled carrier in the cartridge-receiving position and that one of each of the catches $u^3$ and $t^3$ of the chains U and T lie on the upper side of the chain wheels $u'$ and $t'$ (Figs. 34 and 35). After the gun is fired the gun-barrel recoils on the cradle B and the piston $a^{11}$ carries the slide N along and imparts tension to the loading spring L. When the gun-barrel has completed its recoil movement the catch $e^5$ enters the notch $n^3$ of the slide N and the slide is therefore held in position while the gun-barrel again moves forwardly (Fig. 36). During the rearward movement of the slide N the latch $n^{11}$ of the arm $n^{10}$ has passed the catch $u^3$ of the chain U and the bolt $n^{12}$ has passed the free end of the deflector V. No movement has been imparted to the chains U and T. When the gun-barrel again reaches firing position the closure opens and the empty shell thereby ejected hits the lever Q and turns the lever to withdraw the latch $e^9$ from the notch $n^3$. The loading spring L is consequently released and expands to drive the slide N forwardly. During the movement of the slide the bolt $n^{12}$ of the arm $n^{10}$ abuts against the deflector V and, while sliding along the same, turns the carrier from the cartridge-receiving position to the loading position. When the carrier has reached loading position the bolt $n^{12}$ slides off the deflector V (Fig. 38). In the meantime the arm $n^{10}$ has moved the chain U a short distance in the direction of the arrow $w$ (Fig. 36) through the medium of the latch $n^{11}$ and the catch $u^3$, and through the medium of the coupling between the wheels $u'$ and $t'$ the chain T has been moved in the same direction to such an extent that the rear catch $t^3$ lies against the rim of the cartridge in the loading tray. The spring L then expands further and the cartridge is pushed into the gun-barrel. At the end of this pushing movement the catch $t^3$ slides downwardly away from the cap of the cartridge. In that moment the front end of the slide N abuts against the bent front end of the arm $a^{10}$ whereby the forward movement of the slide N is limited. The closure then closes and the breech-block acting on the front end of the loading tray $i'$ swings the carrier J, with the pusher and the device for moving the pusher, back into the cartridge-receiving position and a fresh cartridge drops into the loading tray. Also in the last-described gun the loading accumulator (the spring L) acts directly on the pusher only, while the carrier is brought into the loading position by the parts effecting the insertion of the cartridge.

Having thus described the invention, what is claimed and desired to be secured by Letters Patent is:

1. In a self-loading recoil gun, the combination with the recoiling barrel; of a carrier mounted to move from a cartridge-receiving position to a loading position; a pusher by a single movement of which said carrier is moved to loading position and the cartridge pushed into the gun-barrel; and an accumulator operatively connected with the pusher.

2. In a self-loading recoil gun, the combination with the gun-barrel; of a carrier suitably mounted to be moved from a cartridge-receiving position to a loading position and to return automatically to its cartridge-receiving position; a pusher moving continuously in one direction to move the carrier to its loading position and to push the cartridge into the gun-barrel; an accumulator; and means operatively connecting the pusher with the accumulator.

3. In a self-loading recoil gun, the combination with the gun-barrel of a carrier mounted to move from a cartridge-receiving position to a loading position, a pusher turning about a fixed axis and adapted to push the cartridge from the carrier into the gun-barrel, an accumulator for operating the pusher, and means whereby motion is transmitted from the pusher to the carrier to move the latter to its loading position, said means comprising a pair of faces, one on the carrier and one on the pusher, adapted to coöperate during the first part of the movement of the pusher.

4. In a self-loading recoil gun, the combination with the gun-barrel, of a carrier mounted to move from a cartridge-receiving position to a loading position, an accumulator, a pusher adapted to be operated by the accumulator to push the cartridge from the carrier into the gun-barrel, and means whereby the movement of the pusher is transmitted to the carrier to move the latter to its loading position; said pusher comprising a lever mounted to swing about a horizontal axis at an inclination to the vertical plane through the axis of the bore of the gun-barrel and having a free end located outside of the path of the empty shell ejected from the gun-barrel.

5. In a self-loading recoil gun, the combination with the gun-barrel, of a pusher mounted to move to and fro for inserting a cartridge in the gun-barrel, and an expansible member effecting both of said movements of the pusher by a single expansion.

6. In a self-loading recoil gun, the combination with the recoiling barrel, of a pusher mounted to swing forward and backward for inserting a cartridge into the barrel, an accumulator, means whereby the recoil movement of the barrel stores power in the accumulator, and means whereby power is transmitted from the accumulator to the pusher to effect both the forward and the rearward swinging movement of the pusher.

7. In a self-loading recoil gun, the combination with the recoiling barrel, of a pusher mounted to swing forward and backward for inserting a cartridge into the barrel, an accumulator, means whereby the recoil movement of the barrel stores power in the accumulator, and means whereby power is transmitted from the accumulator to the pusher to effect both the forward and the rearward swinging movement of the pusher, said means comprising a slide operated by the accumulator and a pair of oppositely directed cams arranged on the pusher and adapted to enter alternately into engagement with the slide.

8. In a self-loading recoil gun, the combination with the recoiling barrel, of a pusher mounted to swing forward and backward for inserting a cartridge into the barrel, an accumulator, means whereby the recoil movement of the barrel stores power in the accumulator, and means whereby power is transmitted from the accumulator to the pusher to effect both the forward and the rearward swinging movement of the pusher, said means comprising a slide actuated by the accumulator and having a rigid finger and a movable finger, and a pair of oppositely directed cams on the pusher adapted to cooperate with said fingers.

9. In a self-loading recoil gun, the combination with a recoiling part of the gun, of an accumulator in which force is stored by the recoil movement of said part, a latch adapted to engage the accumulator at the end of the recoil to hold the accumulator in its active position during the return movement of the recoiling part, a spring tending to force the latch into engagement with the accumulator, and means whereby additional tension is imparted to said spring during the recoil movement.

10. In a self-loading recoil gun, the combination with a recoiling part of the gun, of an accumulator in which force is stored by the recoil movement of the recoiling part, a latch adapted to enter into engagement with the accumulator at the end of the recoil to hold the accumulator in its active position during the return movement of the recoiling part, and a spring tending to force the latch into engagement with the accumulator, said spring having one end abutting a recoiling part of the gun whereby additional tension is imparted to the spring during recoil.

11. In a self-loading recoil gun the combination with the gun-barrel; of a feed hopper for the cartridges; a carrier adapted to convey cartridges from the hopper to the barrel; an oscillatory device for supporting the cartridges in the hopper; means actuated by the breech block for withdrawing said device to permit a cartridge to drop into the carrier; and means whereby the carrier is adapted to hold the supporting device in supporting position during the swinging movements of the carrier.

12. In a self-loading recoil gun, the combination with the gun-barrel and the trigger mechanism, of a feed hopper for the cartridges, a carrier for conveying the cartridges from the hopper to the barrel, and a locking device for the trigger mechanism adapted to be released by a cartridge dropping from the hopper on the carrier.

13. In a self-loading recoil gun, the combination with the gun-barrel and the trigger mechanism; of a feed hopper for the cartridges; and a locking device normally locking the trigger mechanism when the supply of cartridges in the hopper is exhausted, said device being pivotally mounted in the wall of said hopper and adapted to be impinged by a cartridge to be forced from its locking position.

14. In a self-loading recoil gun, the combination with the gun-barrel; of a carrier mounted to move from a cartridge-receiving position to a loading position; a pusher connected with the carrier and adapted to operate said carrier and to push the cartridge from the carrier into the gun-barrel by a single movement.

15. In a self-loading recoil gun, the combination with the recoiling barrel, of a cartridge feeding guide, a carrier having a guiding rod and mounted to move from a cartridge-receiving position to a loading position, a pusher adapted to push the cartridge from the carrier into the gun-barrel, arresting levers providing a cartridge stopping means for said feeding guide, a holding device for said arresting levers comprising a double-armed lever mounted on one of the arresting levers, an accumulator, means whereby motion is transmitted from the accumulator to the pusher to operate the same, and means whereby the movement of said first-named means is utilized for moving the carrier to its loading position, said carrier guiding rod adapted to engage one arm of the holding device and cause the other arm thereof to engage a fixed part of the gun on the beginning of the carrier's loading movement whereby to hold said arresting levers in operative position in the guide, said guiding rod having sliding engagement with the arm of the holding device in such manner that said arresting devices are held in operative position during the further swinging movement of said carrier.

The foregoing specification signed at Magdeburg, Germany, this 28 day of October, 1907.

HERMANN LEHMANN.

In presence of—
AUGUST NELZER,
JOHANNES SCHITTENHELM.